Feb. 13, 1945. M. TAMA Re. 22,602

TWIN COIL FURNACE

Original Filed Nov. 13, 1943 2 Sheets-Sheet 1

INVENTOR.
MARIO TAMA
BY G. Fitzsimmons
ATTORNEY.

Feb. 13, 1945. M. TAMA Re. 22,602

TWIN COIL FURNACE

Original Filed Nov. 13, 1943 2 Sheets-Sheet 2

INVENTOR.
MARIO TAMA

BY Eugene Ackerman
ATTORNEY.

Reissued Feb. 13, 1945

Re. 22,602

UNITED STATES PATENT OFFICE 22,602

TWIN COIL FURNACE

Mario Tama, Morrisville, Pa., assignor to Ajax Engineering Corporation, Trenton, N. J.

Original No. 2,347,298, dated April 25, 1944, Serial No. 510,227, November 13, 1943. Application for reissue November 4, 1944, Serial No. 561,981

15 Claims. (Cl. 13—29)

Figure 1:
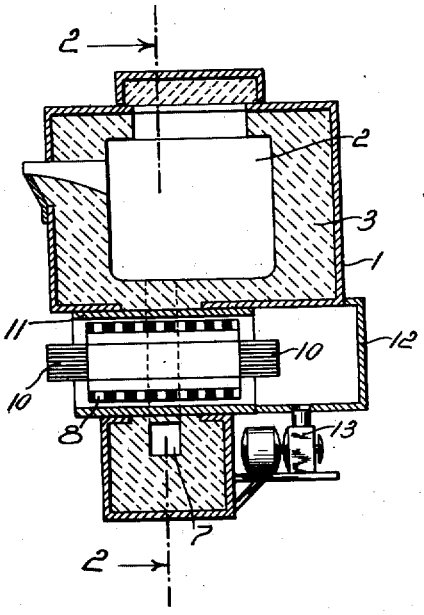

This invention relates to a twin coil induction furnace of the submerged resistor type for melting metals and particularly light metals.

In submerged resistor type induction furnaces the violent movement of the melt occurs by virtue of electro-magnetic forces created in the heating and melting channels which form the secondary loop of the furnace. This vigorous motion of the melt occurs chiefly at those places where the channels enter the hearth.

The circulation resulting from the movement of the melt is, of course, one of the important purposes in an induction furnace and, therefore, beneficial to obtain a uniform composition of the metallic charge.

If, however, light metals, such as aluminum, magnesium and their alloys, are melted in the customary submerged resistor type induction furnace, difficulties arise from excessive stirring and upward movement of the molten metal, inasmuch as an intense oxidation and scorification of the light metals may be caused.

Furthermore, oxides, nitrides and other impurities contained in the melt are apt to penetrate into the melting channels and to be deposited on the walls thereof. The result is that the effective cross-section of the channels is reduced and the power absorbed by the furnace is gradually diminished, until finally the operation of the furnace is interrupted by the clogging of the channels.

In order to adapt submerged resistor type induction furnaces to the melting of light metals, secondary loop constructions have been recommended in prior Patent No. 2,339,964 of Manuel Tama, which comprises straight melting channels of substantially uniform cross area connecting the upper melting hearth and the lower collecting chamber of the furnace under avoidance of outflaring end sections, and Patent No. 2,342,617 of Mario Tama et al., comprising a baffle plate construction for use in furnaces of this type.

This construction of the secondary loop successfully eliminates the drawbacks caused by the premature clogging of the customary melting channels; the periods between the individual slag removals have been extended in these furnaces to more than a hundred times the hitherto accepted duration.

The circulation of the molten charge originates, as previously stated, in a submerged resistor induction furnace mainly from the mouth of the melting channels.

Whereas in the melting of heavy metals the resulting slags have a marked tendency to float on the surface of the metallic bath, the slags created in the light metal melting have a higher spec. gravity than the metals themselves and sink down to the bottom of the bath.

Due to the fact that the upward impetus of the electro-magnetic forces decreases from the circumference of the hearth towards its center, the danger arises that slag particles accumulate in the middle section of the hearth; not only is the removal of slag from this badly accessible part of the hearth difficult, but its gradual accumulation would result in the creation of unequal electromagnetic forces in the center and in the peripheral sections of the hearth.

It, therefore, is an important object of the invention to prevent in melting light metals in twin coil induction furnaces of the submerged resistor type provided with straight heating channels connecting the hearth with a bottom channel the center accumulation of the slag.

It is a further object of the invention to secure uniform current and electromagnetic operating conditions throughout the extended periods of slag removals.

It is also an object of the invention to increase the power factors and to obtain with the same amount of iron in the transformer a larger amount of power.

It is another object of the invention to distribute the automatic stirring of the melt more evenly over the entire surface of the bath.

It is another object of the invention to extend the periods of continuous operation by assuring elimination of the slag, uniformity of working conditions of the furnace and prevention of premature slag deposition in the melting channels at places where they cannot be easily removed during the operation of the furnace.

With these and other objects in view which will become more apparent as this specification proceeds, the invention is illustrated by way of example in the attached drawings, wherein identical parts of the furnace are denominated with the same numerals.

Figure 2:
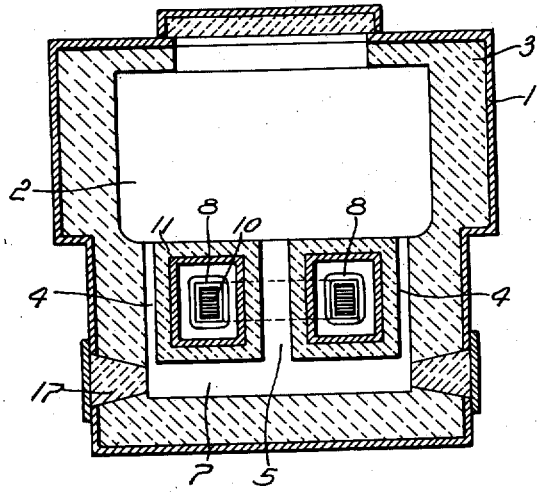
Figure 3:
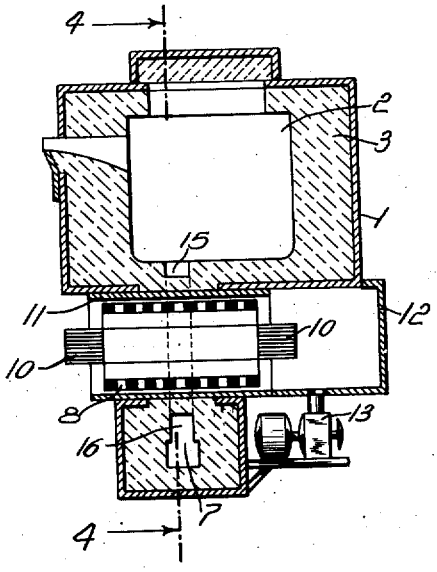
Figure 4:
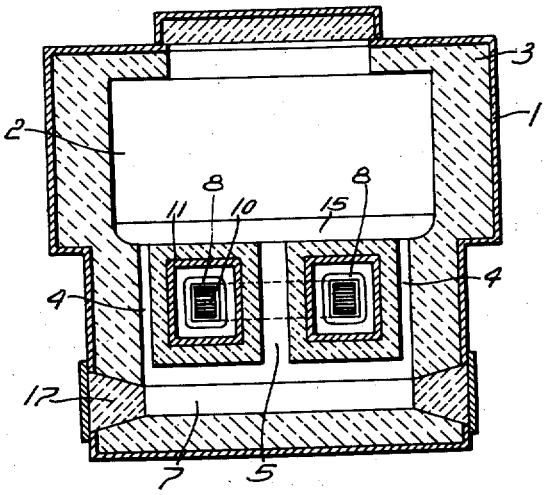

In the drawings,

Fig. 1 is a vertical sectional elevation view of the furnace embodied in this invention, Fig. 2 is a vertical sectional elevation view taken on line 2—2 of Fig. 1, Fig. 3 is a vertical sectional elevation view of another modification of the furnace, and Fig. 4 is a vertical sectional elevation view taken on line 4—4 of Fig. 3.

As shown in the drawings, the principal parts of the furnace are a hearth 2 holding the bulk of the molten charge, a bottom channel 7, a transformer assembly and a secondary loop located between hearth 2 and bottom channel 7. These parts are encased in housing 1 lined with refractory materials 3. The transformer assembly or primary comprises two coils of insulated copper wire, which in operation are connected to a single phase supply source of standard frequency alternating current, not shown. In the drawings these coils are denominated by numeral 8. An iron core 10 threads the primary winding and is closed in itself on both sides of the furnace. The transformer primary assembly is insulated from the refractory of the melting loop by an asbestos cement sleeve 11 and is contained in a housing 12 to which a cooling current of air may be passed by a blower 13. The secondary loop consists of two rectangular branches formed by one vertical straight center channel 5, two straight vertical lateral channels 4, bottom channel 7, which has a larger cross area than the vertical channels, and a bottom section of the charge into which the three melting channels enter. Bottom plugs 17 are provided as a safety measure only for an inspection of the channels from time to time.

Each of these three channels has a substantially uniform cross area over its entire length and all three channels may lead into the hearth and into the bottom channel abruptly and under avoidance of outflaring end sections.

The provision of two lateral and of a central melting channel to form a double branch loop has been already recommended in submerged resistor type induction furnaces having an arc-shaped secondary loop.

The present application of the three channel principle to a submerged resistor type induction furnace having a straight bottom channel and straight vertical channels, the cross area of the bottom channel being larger than the cross area of any of the vertical channels, whereby two rectangular secondary loop branches are created, affords particularly successful achievements in the inductive melting of light metals in as far as an improved uniformity of the electromagnetic forces is assured throughout the entire duration of the greatly extended periods between the individual slag removals. The slags are accumulated against the walls of the channels from where they can be easily removed. The combined use of rectangular coils in the rectangular secondary loop branches results in obtaining closest coupling between the primary and secondary and of a maximum power factor; this is an important advantage of the instant furnace construction.

A second embodiment of this invention is illustrated in Figs. 3 and 4. In conformity therewith grooves 15 and 16 are provided in the bottom section of the hearth 2, and in the roof section of the bottom channel 7, these grooves connecting the upper and the lower ends of the three melting channels 4 and 5.

The two coils of the furnace are connected to a single phase supply line either in series or in parallel. A reverse switch is provided so that the two coils can be quickly changed from series to parallel. The full power of the furnace is obtained when the coils are connected in series. The reverse switch serves to control the temperature of the furnace in an easy way by throwing off the full power when a certain temperature is reached and switch over to reduced power and vice versa.

The average current density in the vertical channels is about three times as high as the average current density in the horizontal bottom channel, whereby the term "average current density" implies that the total current flowing through the channels should be divided by the cross-section of the channels to obtain its value.

The instant furnace may be operated in a particularly satisfactory manner if the ratio of the cross area of the bottom channel to that of the central channel and that of each of the side channels is equal to about 3:2:1.

Various changes may be made of the constructional details disclosed in the foregoing specification without departing from the spirit of the invention or sacrificing advantages thereof; furthermore, the invention is not limited in its application to an induction furnace of the instant type and may be well adapted for use in other induction furnaces.

I claim:

1. In an induction furnace of the submerged resistor type, particularly for melting light metals, an upper hearth, a secondary loop underneath the said hearth, two primary coils threading the secondary loop, the said secondary loop consisting of two rectangular branches formed by one straight substantially vertical center channel, two straight substantially vertical lateral channels and a substantially horizontal bottom channel; the said vertical channels connecting the hearth and the bottom channel, each of the said channels having a substantially uniform cross section over its entire length, the cross section of the said bottom channel being larger than the cross section of any of said vertical channels.

2. In an induction furnace of the submerged resistor type particularly for melting light metals, an upper hearth, a secondary loop underneath the said hearth, two primary coils threading the secondary loop, the said secondary loop consisting of two rectangular branches formed by one straight substantially vertical channel, two straight substantially vertical lateral channels and a substantially horizontal bottom channel, the said vertical channels connecting the hearth and the bottom channel, each of the said channels having substantially uniform cross section over its entire length, all three channels entering the hearth, and the horizontal bottom channel abruptly under avoidance of out-flaring end portions, the cross section of the said bottom channel being larger than the cross section of any of the said vertical channels.

3. In an induction furnace of the submerged resistor type, particularly for melting light metals, an upper hearth, a secondary loop underneath the said hearth, two primary coils threading the secondary loop, the said secondary loop consisting of two rectangular branches formed by one straight substantially vertical center channel, two substantially vertical lateral channels and a substantially horizontal bottom channel, the said vertical channels connecting the hearth and the bottom channel, each of the said channels having a substantially uniform cross section over its entire length, all three channels entering the hearth and the horizontal bottom channel under avoidance of outflaring end portions; the bottom channel having the largest cross section, the center channel a medium cross section and the lateral channels the smallest cross section.

4. In an induction furnace of the submerged resistor type, particularly for melting light metals, an upper hearth, a secondary loop underneath the said hearth, two rectangular primary coils threading the secondary loop, the said secondary loop consisting of two rectangular branches formed by one straight substantially vertical center channel, two straight substantially vertical lateral channels and a substantially horizontal bottom channel, the said vertical channels connecting the hearth and the bottom channel, each of the said channels having substantially a uniform cross section over its entire length, the cross section of the said bottom channel being larger than the cross section of any of the said vertical channels.

5. In an induction furnace of the submerged resistor type, particularly for melting light metals, an upper hearth, a secondary loop underneath the said hearth, two rectangular primary coils threading the secondary loop, the said secondary loop consisting of two rectangular branches formed by one straight substantially vertical channel, two straight substantially vertical lateral channels and a substantially horizontal bottom channel, the said vertical channels connecting the hearth and the bottom channel, each of the said channels having substantially uniform cross section over its entire length, all three channels entering the hearth, and the horizontal bottom channel abruptly under avoidance of outflaring end portions, the cross section of the said bottom channel being larger than the cross section of any of the said vertical channels.

6. In an induction furnace of the submerged resistor type, particularly for melting metals, an upper hearth, a secondary loop underneath the said hearth, two rectangular primary coils threading the secondary loop, the said secondary loop consisting of two rectangular branches formed by one straight substantially vertical center channel, two substantially vertical lateral channels, and a substantially horizontal bottom channel, the said vertical channels connecting the hearth and the bottom channel, each of the said channels having a substantially uniform cross section over its entire length, all three channels entering the hearth and the horizontal bottom channel under avoidance of outflaring end portion; the bottom channel having the largest cross-section, the center channel a medium cross section and the lateral channels the smallest cross section.

7. In an induction furnace of the submerged resistor type particularly for melting light metals, an upper hearth, a secondary loop underneath the said hearth, two primary coils threading the secondary loop, the said secondary loop consisting of two rectangular branches formed by one straight substantially vertical center channel, two straight substantially vertical lateral channels and a substantially horizontal bottom channel, the said vertical channels connecting the hearth and the bottom channel, each of the said channels having a substantially uniform cross section over its entire length and grooves in the bottom section of the hearth connecting the ends of the three vertical channels, the cross section of the said bottom channel being larger than the cross section of any of the said vertical channels.

8. In an induction furnace of the submerged resistor type, particularly for melting light metals, an upper hearth, a secondary loop underneath the said hearth, two primary coils threading the secondary loop, the said secondary loop consisting of two rectangular branches formed by one straight substantially vertical center channel, two straight substantially vertical lateral channels and a substantially horizontal bottom channel, the said vertical channels connecting the hearth and the bottom channel, each of the said channels having a substantially uniform cross section over its entire length, all the three channels entering the hearth and the horizontal bottom channel abruptly under avoidance of outflaring end portions and grooves in the bottom section of the hearth connecting the ends of the three vertical channels, the cross section of the said bottom channel being larger than the cross section of any of the said vertical channels.

9. In an induction furnace of the submerged resistor type, particularly for melting light metals, an upper hearth, a secondary loop underneath the said hearth, two primary coils threading the secondary loop, the said secondary loop consisting of two rectangular branches formed by one straight substantially vertical center channel, two straight substantially vertical lateral channels and a substantially horizontal bottom channel, the said vertical channels connecting the hearth and the bottom channel, each of the said channels having a substantially uniform cross-section over its entire length, all three channels entering the hearth and the horizontal bottom channel abruptly under avoidance of outflaring end portions, grooves in the bottom section of the hearth and in the roof section of the horizontal bottom channel connecting the ends of the three vertical channels, the cross section of the said bottom channel being larger than the cross section of any of the said vertical channels.

10. In an induction furnace of the submerged resistor type, particularly for melting light metals, an upper hearth, a secondary loop underneath the said hearth, two primary coils threading the secondary loop, the said secondary loop consisting of two rectangular branches formed by one straight substantially vertical center channel, two straight substantially vertical lateral channels and a substantially horizontal bottom channel, the said vertical channels connecting the hearth and the bottom channel, each of the said channels having a substantially uniform cross section over its entire length, all three channels entering the hearth and the horizontal bottom channel abruptly under avoidance of outflaring end portions, grooves in the bottom section of the hearth and in the roof section of the horizontal bottom channel connecting the ends of the three vertical channels, the bottom channels having the largest cross section, the center channel a medium cross section and the lateral channels the smallest cross section.

11. In an induction furnace of the submerged resistor type, particularly for melting light metals, an upper hearth, a secondary loop underneath the said hearth, two rectangular primary coils threading the secondary loop, the said secondary loop consisting of two rectangular branches formed by one straight substantially vertical channel, two straight substantially vertical lateral channels and a substantially horizontal bottom channel, the said vertical channels connecting the hearth and the bottom channel, each of the said channels having a substantially uniform cross section over its entire length and grooves in the bottom section of the hearth connecting the ends of the three vertical channels, the cross section of the said bottom channel being larger than the cross section of any of the said vertical channels.

12. In an induction furnace of the submerged resistor type, particularly for melting light metals, an upper hearth, a secondary loop underneath the said hearth, two rectangular primary coils threading the secondary loop, the said secondary loop consisting of two rectangular branches formed by one straight substantially vertical center channel, two straight substantially vertical lateral channels and a substantially horizontal bottom channel, the said vertical channels connecting the hearth and the bottom channel, each of the said channels having a substantially uniform cross section over its entire length, all the three channels entering the hearth and the horizontal bottom channel abruptly under avoidance of outflaring end portions and grooves in the bottom section of the hearth connecting the ends of the three vertical channels, the cross section of the said bottom channel being larger than the cross section of any of the said vertical channels.

13. In an induction furnace of the submerged resistor type, particularly for melting light metals, an upper hearth, a secondary loop underneath the said hearth, two rectangular primary coils threading the secondary loop, the secondary loop consisting of two rectangular branches formed by one straight substantially vertical center channel, two straight substantially vertical lateral channels and a substantially horizontal bottom channel, the said vertical channels connecting the hearth and the bottom channel, each of the said channels having a substantially uniform cross section over its entire length, all the three channels entering the hearth and the horizontal bottom channel abruptly under avoidance of outflaring end portions, grooves in the bottom section of the hearth and in the roof section of the horizontal bottom channel connecting the ends of the three vertical channels, the cross section of the said bottom channel being larger than the cross section of any of the said vertical channels.

14. In an induction furnace of the submerged resistor type, particularly for melting light metals, an upper hearth, a secondary loop underneath the said hearth, two rectangular primary coils threading the secondary loop, the said secondary loop consisting of two rectangular branches formed by one straight substantially vertical center channel, two straight substantially vertical lateral channels and a substantially horizontal bottom channel, the said vertical channels connecting the hearth and the bottom channel, each of the said channels having a substantially uniform cross section over its entire length, all three channels entering the hearth and the horizontal bottom channel abruptly under avoidance of outflaring end portions, grooves in the bottom section of the hearth and in the roof section of the horizontal bottom channel connecting the ends of the three vertical channels, the bottom channels having the largest cross-section, the center channel a medium cross section, and the lateral channels the smallest cross section.

15. In an induction furnace of the submerged resistor type, particularly for melting light metals, an upper hearth, a secondary loop underneath the said hearth, two primary coils threading the secondary loop, the said secondary loop consisting of two rectangular branches formed by one straight substantially vertical channel, two straight substantially vertical lateral channels and a substantially horizontal bottom channel, the said vertical channels connecting the hearth and the bottom channel, each of the said channels having a substantially uniform cross section over its entire length, the bottom channel having the largest cross section, the center channel a medium cross section and the lateral channels the smallest cross section, the ratio of the cross sections of the bottom channel, the center channel and each of the lateral channels being approximately equal to 3:2:1.

MARIO TAMA.